US005971274A

United States Patent [19]
Milchman

[11] Patent Number: 5,971,274
[45] Date of Patent: Oct. 26, 1999

[54] APPARATUS AND METHODS FOR PROVIDING FINANCIAL SERVICES

[75] Inventor: Moshe Milchman, Ramat Hasharon, Israel

[73] Assignee: Inflight Financial Services Ltd., Dublin, Ireland

[21] Appl. No.: 09/014,792

[22] Filed: Jan. 28, 1998

[51] Int. Cl.$^6$ .................................................. G07B 15/02
[52] U.S. Cl. ........................................ 235/384; 235/379
[58] Field of Search ................................... 235/379, 375, 235/380, 389, 382, 382.5, 384

[56] References Cited

U.S. PATENT DOCUMENTS

| | | | |
|---|---|---|---|
| 4,578,009 | 3/1986 | Granzow et al. | 414/43 |
| 4,669,393 | 6/1987 | Wuthrich | 109/48 |
| 4,890,824 | 1/1990 | Uchida et al. | 271/3.1 |
| 4,953,086 | 8/1990 | Pakatsu | 235/379 |
| 4,977,994 | 12/1990 | Adachi et al. | 194/210 |
| 5,036,779 | 8/1991 | Capraro | 109/24.01 |
| 5,285,926 | 2/1994 | Falk et al. | 221/2 |
| 5,299,511 | 4/1994 | Dallman et al. | 109/24.01 |
| 5,670,768 | 9/1997 | Modiano et al. | 239/379 |

Primary Examiner—Thien M Le
Attorney, Agent, or Firm—Limbach & Limbach LLP

[57] ABSTRACT

An airborne money exchange and point of sale system including a support located within an aircraft and containing at least one good for sale which is associated with a machine readable product code, and multi-purpose financial services apparatus mounted on the support including a computer including a display, the computer being programmed to perform money exchange and point of sale functions, the computer including a user input interface enabling a user to select money exchange and point of sale functions, a product code reader suitable for reading the product code and providing a product input to the computer, and a banknote acceptor operative to accept banknotes in a plurality of currencies and providing a payment input to the computer, the computer being operative in response to the product input and the payment input and to user selection of the product input function for computing change due to a purchaser of a product in a first currency, and the computer also being operative in response to the payment input and to user selection of the money exchange function for computing an exchange payment due to a person changing money in a second currency.

32 Claims, 3 Drawing Sheets

APPARATUS AND METHODS FOR PROVIDING FINANCIAL SERVICES

FIELD OF THE INVENTION

The present invention relates to apparatus and methods for providing financial services in general, and in particular to providing inflight duty-free shopping and currency exchange services.

BACKGROUND OF THE INVENTION

The use of computer controlled machines to perform financial transactions such as recording sales transactions, dispensing cash, and to changing money from one currency to another has become widespread in recent years. Such machines are normally dedicated to a single one of these functions and are generally located at fixed locations, such as outside banks or in shopping centers.

Applicant/assignee's U.S. Pat. No. 5,670,768 is believed to be representative of the state of the art.

The disclosures of all publications mentioned in this specification and of the publications cited therein are hereby incorporated by reference.

SUMMARY OF THE INVENTION

The present invention seeks to make automated financial services available on means of transport, such as airplanes, particularly those on international routes, so as to enable travelers to simultaneously make purchases, such as duty free purchases, change their money into the currency in use at their destination, and draw such currency against debit and credit accounts.

There is thus provided in accordance with a preferred embodiment of the present invention an airborne money exchange and point of sale system including a support located within an aircraft and containing at least one good for sale which is associated with a machine readable product code, and multi-purpose financial services apparatus mounted on the support including a computer including a display, the computer being programmed to perform money exchange and point of sale functions, the computer including a user input interface enabling a user to select money exchange and point of sale functions, a product code reader suitable for reading the product code and providing a product input to the computer, and a banknote acceptor operative to accept banknotes in a plurality of currencies and providing a payment input to the computer, the computer being operative in response to the product input and the payment input and to user selection of the product input function for computing change due to a purchaser of a product in a first currency, and the computer also being operative in response to the payment input and to user selection of the money exchange function for computing an exchange payment due to a person changing money in a second currency.

Further in accordance with a preferred embodiment of the present invention either of the first and second currencies is a predetermined currency.

Still further in accordance with a preferred embodiment of the present invention either of the first and second currencies is a user-selected currency.

Additionally in accordance with a preferred embodiment of the present invention the first and second currencies are the same.

Moreover in accordance with a preferred embodiment of the present invention either of the first and second currencies is the currency of a destination country of the aircraft.

Further in accordance with a preferred embodiment of the present invention the good is marked with the machine readable product code.

Still further in accordance with a preferred embodiment of the present invention the multi-purpose financial services apparatus further includes a card reader for reading a magnetic stripe bearing card and for providing a card input to the computer, and the computer is additionally operative in response to the card input and to user selection of a card input function and to user input of card input criteria for computing either of a credit payment and a debit payment due to a person withdrawing money in a selected currency.

Additionally in accordance with a preferred embodiment of the present invention the card is a credit card.

Moreover in accordance with a preferred embodiment of the present invention the card is a debit card.

Further in accordance with a preferred embodiment of the present invention the criteria includes a cash amount.

Still further in accordance with a preferred embodiment of the present invention the criteria includes a PIN number.

Additionally in accordance with a preferred embodiment of the present invention the multi-purpose financial services apparatus further includes an automated banknote dispenser in communication with the computer, and the computer is additionally operative to control the dispenser to dispense a predetermined amount of money due to either of the purchaser and the person.

Moreover in accordance with a preferred embodiment of the present invention the support includes a wheeled trolley.

Further in accordance with a preferred embodiment of the present invention the support includes a counter.

There is also provided in accordance with a preferred embodiment of the present invention a transport vehicle including a support containing at least one good for sale which is associated with a machine readable product code, and multi-purpose financial services apparatus mounted on the support including a computer including a display, the computer being programmed to perform money exchange and point of sale functions, the computer including a user input interface enabling a user to select money exchange and point of sale functions, a product code reader suitable for reading the product code and providing a product input to the computer, and a banknote acceptor operative to accept banknotes in a plurality of currencies and providing a payment input to the computer, the computer being operative in response to the product input and the payment input and to user selection of the product input function for computing change due to a purchaser of a product in a first currency and the computer also being operative in response to the payment input and to user selection of the money exchange function for computing an exchange payment due to a person changing money in a second currency.

Further in accordance with a preferred embodiment of the present invention the transport vehicle is an aircraft.

There is additionally provided in accordance with a preferred embodiment of the present invention an airborne money exchange and point of sale system including a support located within an aircraft and containing at least one good for sale which is associated with a machine readable product code, and multi-purpose financial services apparatus mounted on the support including a computer including a display, the computer being programmed to perform money exchange functions, the computer including a user input interface enabling a user to select money exchange functions, and a banknote acceptor operative to accept banknotes in a plurality of currencies and providing a payment input to the computer, the computer being operative in response to the payment input and to user selection of the money exchange function for computing a payment due to a person changing money in a selected currency.

There is also provided in accordance with a preferred embodiment of the present invention a method of providing money exchange and point of sale services including providing a support located within an aircraft and containing at least one good for sale which is associated with a machine readable product code, providing multi-purpose financial services apparatus mounted on the support including a computer including a display, the computer being programmed to perform money exchange and point of sale functions, the computer including a user input interface enabling a user to select money exchange and point of sale functions, a product code reader suitable for reading the product code and providing a product input to the computer, and a banknote acceptor operative to accept banknotes in a plurality of currencies and providing a payment input to the computer, causing the product code reader to read the machine readable product code, causing the banknote acceptor to accept the payment input, causing the computer in response to the product input and the payment input and to user selection of the product input function to compute change due to a purchaser of a product in a first currency, and causing the computer in response to the payment input and to user selection of the money exchange function to compute an exchange payment due to a person changing money in a second currency.

Still further in accordance with a preferred embodiment of the present invention either of the causing—to compute steps includes causing—to compute in a predetermined currency.

Additionally in accordance with a preferred embodiment of the present invention either of the causing—to compute steps includes causing—to compute in a user-selected currency.

Moreover in accordance with a preferred embodiment of the present invention both of the causing—to compute steps include causing—to compute in the same currency.

Further in accordance with a preferred embodiment of the present invention either of the causing—to compute steps includes causing—to compute in a currency of a destination country of the aircraft.

Still further in accordance with a preferred embodiment of the present invention the method further includes providing with the multi-purpose financial services apparatus a card reader for reading a magnetic stripe bearing card and for providing a card input to the computer, causing the card reader to read the magnetic stripe bearing card and provide the card input to the computer, causing the computer in response to the card input and to user selection of a card input function and to user input of card input criteria to compute either of a credit payment and a debit payment due to a person withdrawing money in a selected currency.

Additionally in accordance with a preferred embodiment of the present invention the causing the card reader step includes causing the card reader to read a credit card.

Moreover in accordance with a preferred embodiment of the present invention the causing the card reader step includes causing the card reader to read a debit card.

Further in accordance with a preferred embodiment of the present invention the causing the computer in response to the card input step includes computing the criteria includes a cash amount.

Still further in accordance with a preferred embodiment of the present invention the method further includes providing with the multi-purpose financial services apparatus an automated banknote dispenser in communication with the computer, causing the dispenser to dispense a predetermined amount of money due to either of the purchaser and the person.

Additionally in accordance with a preferred embodiment of the present invention the providing a support step includes providing a wheeled trolley.

Moreover in accordance with a preferred embodiment of the present invention the providing a support step includes providing a counter.

There is also provided in accordance with a preferred embodiment of the present invention a method of providing money exchange and point of sale services including providing a transport vehicle including a support located within an aircraft and containing at least one good for sale which is associated with a machine readable product code, and multi-purpose financial services apparatus mounted on the support including a computer including a display, the computer being programmed to perform money exchange and point of sale functions, the computer including a user input interface enabling a user to select money exchange and point of sale functions, a product code reader suitable for reading the product code and providing a product input to the computer, and a banknote acceptor operative to accept banknotes in a plurality of currencies and providing a payment input to the computer, causing the product code reader to read the machine readable product code, causing the banknote acceptor to accept the payment input, causing the computer in response to the product input and the payment input and to user selection of the product input function to compute change due to a purchaser of a product in a first currency, and causing the computer in response to the payment input and to user selection of the money exchange function to compute an exchange payment due to a person changing money in a second currency.

Further in accordance with a preferred embodiment of the present invention the providing a transport vehicle step includes providing a transport vehicle which is an aircraft.

There is additionally provided in accordance with a preferred embodiment of the present invention a method of providing money exchange and point of sale services including providing a support located within an aircraft and containing at least one good for sale which is associated with a machine readable product code, providing multi-purpose financial services apparatus mounted on the support including a computer including a display, the computer being programmed to perform money exchange and point of sale functions, the computer including a user input interface enabling a user to select money exchange and point of sale functions, and a banknote acceptor operative to accept banknotes in a plurality of currencies and providing a payment input to the computer, causing the banknote acceptor to accept the payment input, causing the computer in response to the payment input and to user selection of the money exchange function to compute a payment due to a person changing money in a selected currency.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
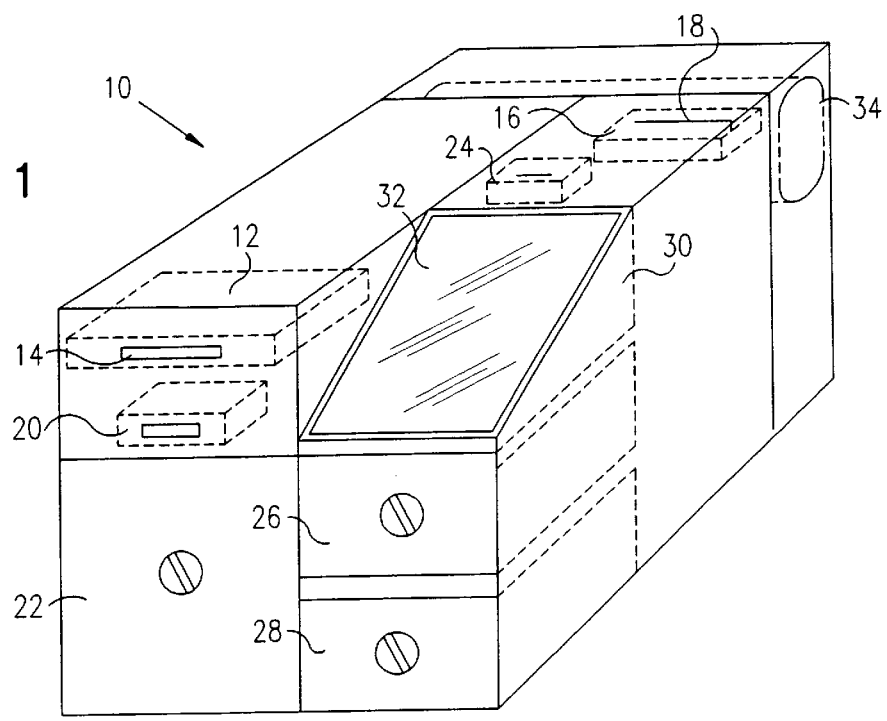
FIG. 1 is a simplified pictorial illustration of multi-purpose financial services apparatus constructed and operative in accordance with a preferred embodiment of the present invention.

Reference is now made to FIG. 1 which is a simplified pictorial illustration of multi-purpose financial services apparatus 10 constructed and operative in accordance with a preferred embodiment of the present invention. Multi-purpose financial services apparatus 10 is typically configured with at least one banknote acceptor 12 having a respective banknote slot 14. Banknote acceptor 12, such as is commercially available from BillCoin Systems AB of Sweden, is preferably capable of accepting and identifying a variety of predetermined currencies. Banknote acceptor 12 is preferably configured to feed banknotes into an incoming cash drawer 22.

Multi-purpose financial services apparatus 10 also preferably includes a card reader 16 having a respective card slot 18 for reading bank cards or credit cards, in order to enable a traveler to purchase an item, such as a duty free item, and/or draw money against his credit card or bank account while traveling. Card reader 16 is typically a MagScan card reader which is commercially available from Barcode Industries of Beltsville, Md., U.S.A. 20705. Alternatively or additionally a smart card reader may be provided.

A bar code scanner 20 is also preferably provided with multi-purpose financial services apparatus 10 for scanning bar codes associated with and identifying duty free items or other items for purchase. Bar code scanner 20 is typically a Miniscan model LS-1220, commercially available from Symbol Technologies, Inc.

A printer 24 is also preferably provided for printing receipts bearing transaction information and other reports. Printer 24 is typically an Ap24 miniature impact printer, commercially available from various vendors.

One or more outgoing cash sources such as sources 26 and 28 are preferably provided containing banknotes to be dispensed as change during a purchase, as cash during a bank card or credit card debit or credit transaction, as cash during a moneychanging transaction, or as a result of any combination of these transactions. Sources 26 and 28 may be manually operated cash drawers or may be automated banknote dispensers such as 1700 Series Single Denomination Dispensers, commercially available from De La Rue of Inter Innovation 1992 of Havant, Hampshire, U.K., a configuration of which is described in greater detail with reference to U.S. Pat. No. 5,670,768, incorporated herein by reference. Where more than one outgoing cash source is configured with multi-purpose financial services apparatus 10, each source is preferably used for dispensing banknotes in a different currency. For example, one source may contain a universal currency, such as US dollars, while another source contains a currency of the destination country of the transport vehicle.

Also assembled with multi-purpose financial services apparatus 10 is a computer 30 having a display 32. Display 32, such as a VGA display available from Sharp Inc., is preferably a touch-screen display incorporating a touch-screen element such as is commercially available from Elo Touchsystems GmBH. Display 32 is typically used as an operator interface for providing user instructions, menus and messages, and can be used for selecting functions and currencies, for entering currency amounts, product information, access codes and other information.

Computer 30 is preferably in communication with banknote acceptor 12, card reader 16, bar code scanner 20, printer 24, and sources 26 and 28 for control thereof and/or receipt of inputs therefrom, via connections not shown. Computer 30 is preferably periodically configured with currency information such as denominations and exchange rates, and product identification information such as price, bar code information, etc. regarding duty free or other items for purchase.

Any of the electronic elements of multi-purpose financial services apparatus 10 described hereinabove may be powered by a power source 34, such as a DC battery power source, via connections not shown.

Figure 2:
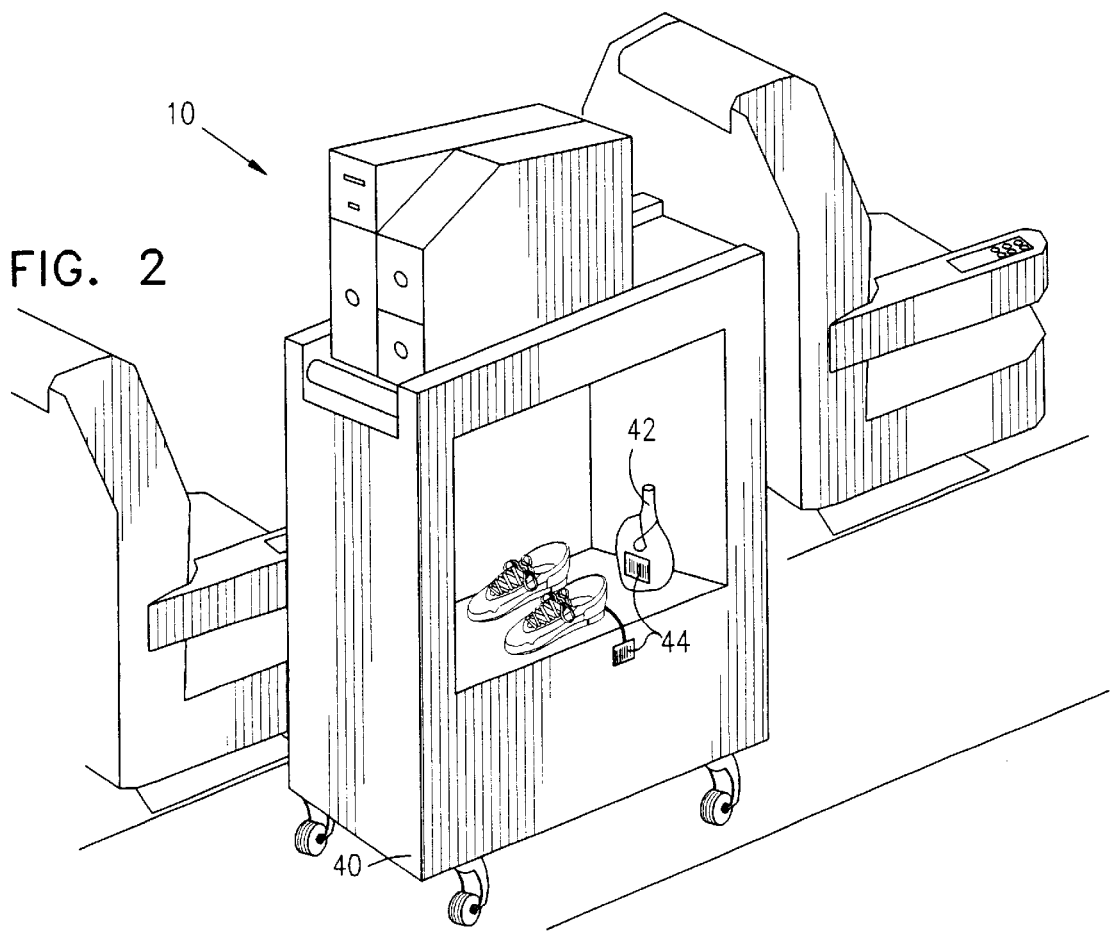
FIG. 2 is a simplified pictorial illustration of the multi-purpose financial services apparatus of FIG. 1 mounted upon an airplane trolley.

FIG. 2 shows multi-purpose financial services apparatus 10 preferably mounted atop a support, such as a standard trolley 40 as is used in transport applications for rolling down an aircraft aisle. Trolley 40 may be a standard wheeled trolley which is commercially available from Driessen of Limmen, Holland. Trolley 40 may contain one or more duty free or other items 42 for purchase. Each item 42 is preferably marked with a machine readable product code 44 such as a bar code.

A typical operational scenario of multi-purpose financial services apparatus 10 of FIGS. 1 and 2 is now described. Multi-purpose financial services apparatus 10 is placed and preferably secured atop trolley 40 for use on an airplane during a flight, such as between London and New York. A flight attendant wheels trolley 40 along an aisle of the airplane. A passenger wishing to exchange a first currency from among a variety of currencies, such as British Pounds, for a second currency, such as U.S. Dollars, hands banknotes in British Pounds to the flight attendant who then feeds the banknotes into banknote acceptor 12 through banknote slot 14. Banknote acceptor 14 scans each banknote to determine its currency type and denomination, both of which are then communicated to computer 30. Computer 30 then converts the first currency amount, preferably using preprogrammed currency exchange rates, to an equivalent amount in the second currency, less a commission, if any. The second currency may then be disbursed manually by the flight attendant or automatically from either of sources 26 and 28 that contains the second currency.

Typically, the flight attendant, or a technician in a distribution center which provides multi-purpose financial services apparatus 10 to the airplane, indicates via display 32 the currency available for disbursement from each of sources 26 and 28, typically being a universal currency and the currency of the destination country. This is preferably done prior to departure or otherwise prior to performing a passenger transaction.

In a preferred embodiment of multi-purpose financial services apparatus 10, the passenger exchanges currency concurrent with a purchase of one or more duty free or other items. The items may be contained within trolley 40, or may be purchased from a catalog. Bar code scanner 20 is preferably used to scan a bar code with which an item is marked or which is otherwise associated with an item and communicate the information to computer 30. The item price may be expressed in the first currency which the passenger then provides. The passenger may subsequently receive change in the second currency, less a commission if any. Where the passenger wishes to purchase an item using a currency other than the currency in which the price of the item is expressed, the flight attendant may scan the bar code of the item, select the currency with which the passenger wishes to pay, and indicate the appropriate amount in the passenger's currency.

In another preferred embodiment of multi-purpose financial services apparatus 10, the passenger may use a credit card or debit card to purchase an item and/or to indicate a currency amount and withdraw currency available for disbursement. Multi-purpose financial services apparatus 10 may be in communication with credit and debit services for authorizing a credit or debit transaction as is known for point-of-sale and ATM terminals. Multi-purpose financial services apparatus 10 may also accept a PIN or other identification input typically via display 32 as is also known for point-of-sale and ATM terminals.

Figure 3:
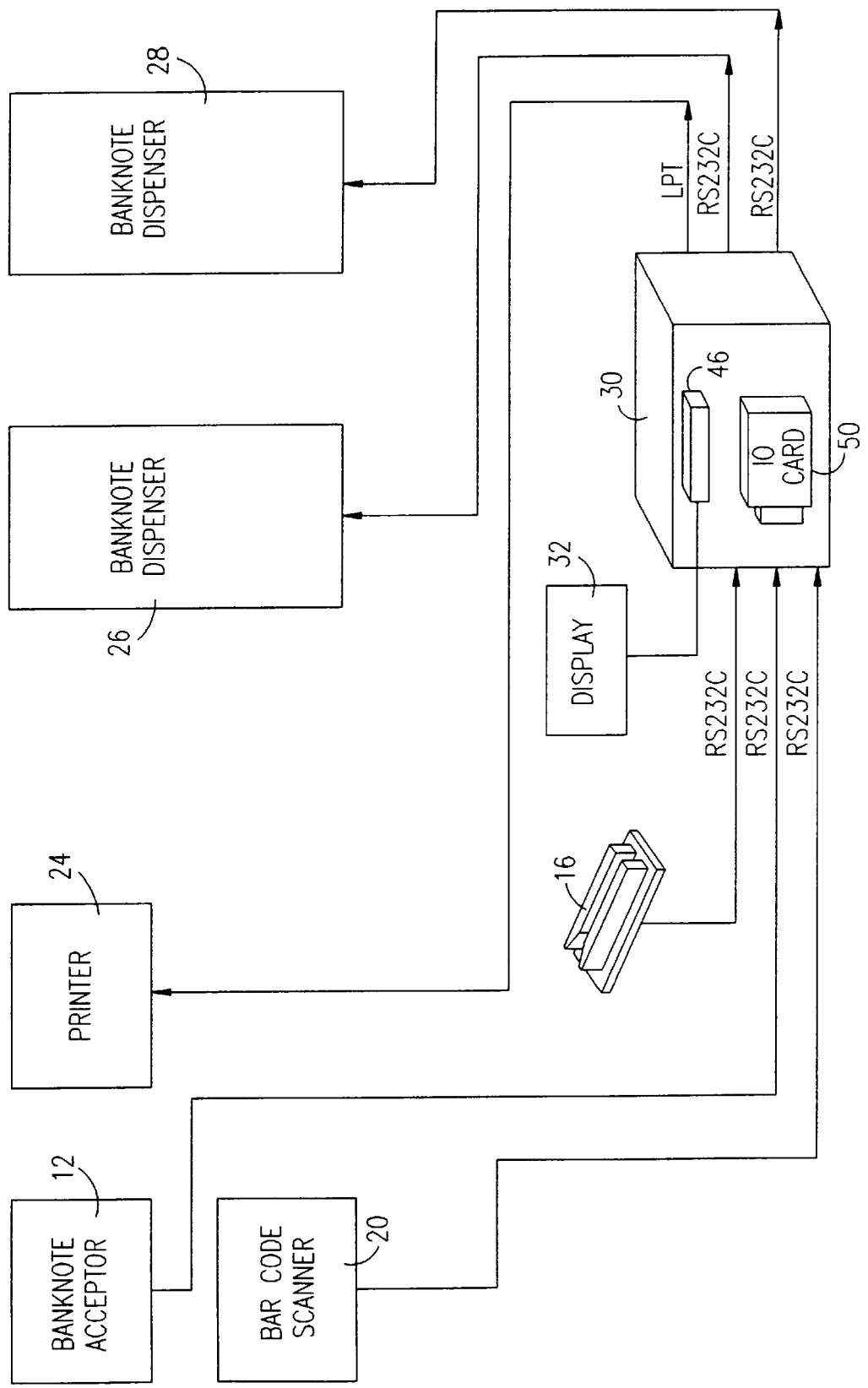
FIG. 3 is a simplified block diagram of the multi-purpose financial services apparatus of FIG. 1.

FIG. 3 is a simplified block diagram of multi-purpose financial services apparatus 10 of FIG. 1. Computer 30 may be an ordinary personal computer, such as a computer based on the Pentium™ microprocessor available from Intel Corporation. Computer 30 is preferably in communication with banknote acceptor 12, card reader 16, and bar code scanner 20 via standard RS 232C interface connections.

Display 32 is connected to computer 30 via a display card 46 in computer 30. Printer 24 typically interfaces with computer 30 via a standard LPT parallel port of computer 30. Sources 26 and 28, when configured as automatic banknote dispensers described hereinabove, typically interface with computer 30 via standard RS 232C interface connections.

Figure 4:
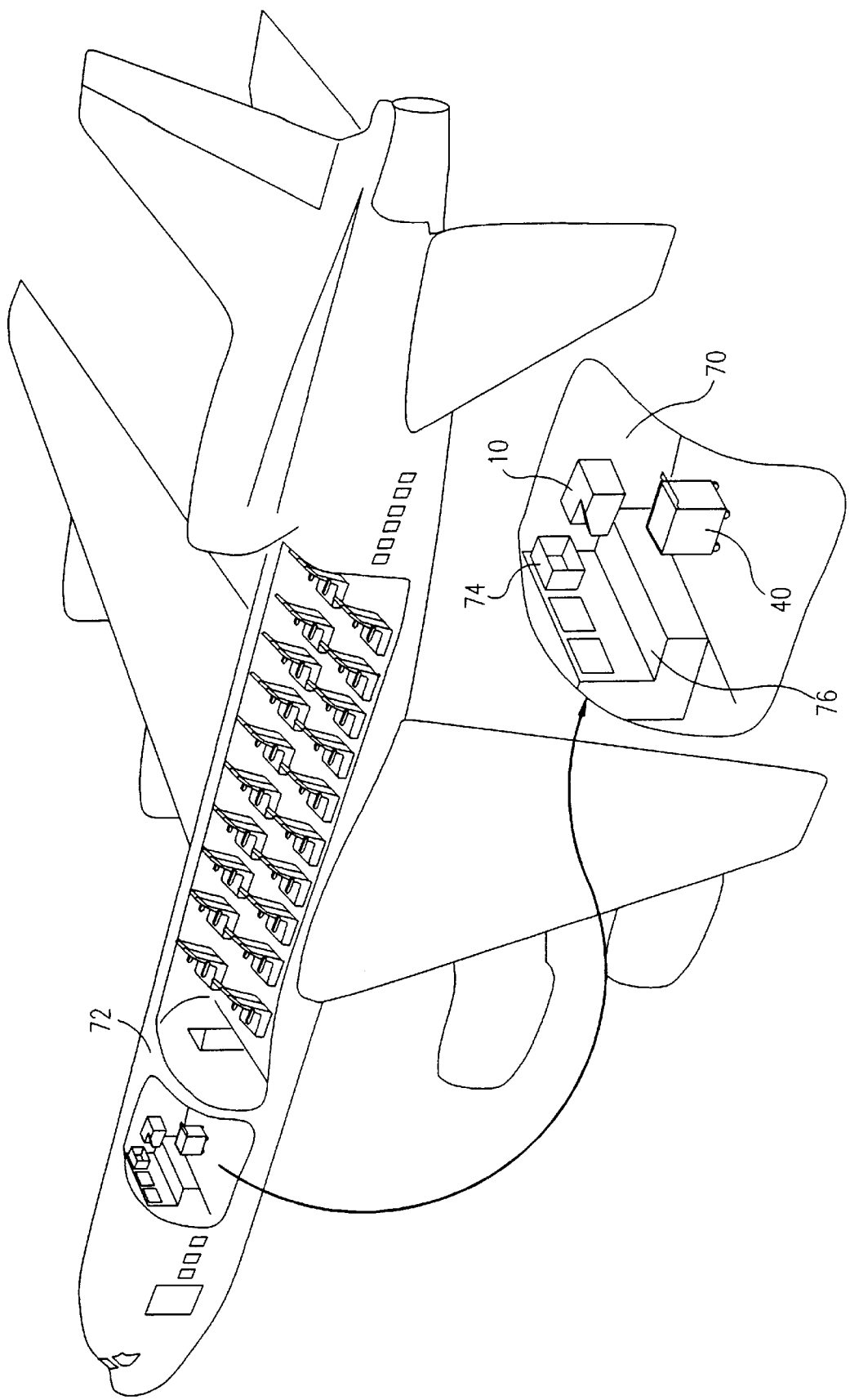
FIG. 4 is a simplified pictorial illustration illustrating the multi-purpose financial services apparatus of FIG. 1 stored in an aircraft galley.

FIG. 4 illustrates multi-purpose financial services apparatus 10 located in storage in a galley 70 of an aircraft 72, such as in a storage bin 74 such as a standard Atlas storage bin also commercially available from Driessen of Limmen, Holland. It is appreciated that financial services apparatus 10 is preferably mounted atop trolley 40 in galley 70 and rolled out of the galley for use, although financial services apparatus 10 may also be used at a stationary support, such as atop a counter 76.

It will be appreciated by persons skilled in the art that the present invention is not limited to what has been particularly shown and described hereinabove. Rather the scope of the present invention is defined only by the claims which follow:

We claim:

1. An airborne money exchange and point of sale system comprising:
   a support located within an aircraft and containing at least one good for sale which is associated with a machine readable product code; and
   multi-purpose financial services apparatus mounted on said support comprising:
      a computer including a display, said computer being programmed to perform money exchange and point of sale functions, said computer including a user input interface enabling a user to select money exchange and point of sale functions;
      a product code reader suitable for reading said product code and providing a product input to said computer; and
      a banknote acceptor operative to accept banknotes in a plurality of currencies and providing a payment input to said computer,
      said computer being operative in response to said product input and said payment input and to user selection of said product input function for computing change due to a purchaser of a product in a first currency, and
      said computer also being operative in response to said payment input and to user selection of said money exchange function for computing an exchange payment due to a person changing money in a second currency.

2. An airborne money exchange and point of sale system according to claim 1 wherein either of said first and second currencies is a predetermined currency.

3. An airborne money exchange and point of sale system according to claim 1 wherein either of said first and second currencies is a user-selected currency.

4. An airborne money exchange and point of sale system according to claim 1 wherein said first and second currencies are the same.

5. An airborne money exchange and point of sale system according to claim 1 wherein either of said first and second currencies is the currency of a destination country of said aircraft.

6. An airborne money exchange and point of sale system according to claim 1 wherein said good is marked with said machine readable product code.

7. An airborne money exchange and point of sale system according to claim 1 wherein said multi-purpose financial services apparatus further comprises a card reader for reading a magnetic stripe bearing card and for providing a card input to said computer, and wherein said computer is additionally operative in response to said card input and to user selection of a card input function and to user input of card input criteria for computing either of a credit payment and a debit payment due to a person withdrawing money in a selected currency.

8. An airborne money exchange and point of sale system according to claim 7 wherein said card is a credit card.

9. An airborne money exchange and point of sale system according to claim 7 wherein said card is a debit card.

10. An airborne money exchange and point of sale system according to claim 7 wherein said criteria comprises a cash amount.

11. An airborne money exchange and point of sale system according to claim 7 wherein said criteria comprises a PIN number.

12. An airborne money exchange and point of sale system according to claim 1 wherein said multi-purpose financial services apparatus further comprises an automated banknote dispenser in communication with said computer, and wherein said computer is additionally operative to control said dispenser to dispense a predetermined amount of money due to either of said purchaser and said person.

13. An airborne money exchange and point of sale system according to claim 1 wherein said support comprises a wheeled trolley.

14. An airborne money exchange and point of sale system according to claim 1 wherein said support comprises a counter.

15. A transport vehicle comprising:
   a support containing at least one good for sale which is associated with a machine readable product code; and
   multi-purpose financial services apparatus mounted on said support comprising:
      a computer including a display, said computer being programmed to perform money exchange and point of sale functions, said computer including a user input interface enabling a user to select money exchange and point of sale functions;

a product code reader suitable for reading said product code and providing a product input to said computer; and a banknote acceptor operative to accept banknotes in a plurality of currencies and providing a payment input to said computer, said computer being operative in response to said product input and said payment input and to user selection of said product input function for computing change due to a purchaser of a product in a first currency and said computer also being operative in response to said payment input and to user selection of said money exchange function for computing an exchange payment due to a person changing money in a second currency.

16. A transport vehicle according to claim 15 wherein said transport vehicle is an aircraft.

17. An airborne money exchange and point of sale system comprising:

a support located within an aircraft and containing at least one good for sale which is associated with a machine readable product code; and multi-purpose financial services apparatus mounted on said support comprising:

a computer including a display, said computer being programmed to perform money exchange functions, said computer including a user input interface enabling a user to select money exchange functions; and a banknote acceptor operative to accept banknotes in a plurality of currencies and providing a payment input to said computer, said computer being operative in response to said payment input and to user selection of said money exchange function for computing a payment due to a person changing money in a selected currency.

18. A method of providing money exchange and point of sale services comprising:

providing a support located within an aircraft and containing at least one good for sale which is associated with a machine readable product code;

providing multi-purpose financial services apparatus mounted on said support comprising:

a computer including a display, said computer being programmed to perform money exchange and point of sale functions, said computer including a user input interface enabling a user to select money exchange and point of sale functions;

a product code reader suitable for reading said product code and providing a product input to said computer; and a banknote acceptor operative to accept banknotes in a plurality of currencies and providing a payment input to said computer;

causing said product code reader to read said machine readable product code;

causing said banknote acceptor to accept said payment input;

causing said computer in response to said product input and said payment input and to user selection of said product input function to compute change due to a purchaser of a product in a first currency; and causing said computer in response to said payment input and to user selection of said money exchange function to compute an exchange payment due to a person changing money in a second currency.

19. A method according to claim 18 wherein either of said causing—to compute steps comprises causing—to compute in a predetermined currency.

20. A method according to claim 18 wherein either of said causing—to compute steps comprises causing—to compute in a user-selected currency.

21. A method according to claim 18 wherein both of said causing—to compute steps comprise causing—to compute in the same currency.

22. A method according to claim 18 wherein either of said causing—to compute steps comprises causing—to compute in a currency of a destination country of said aircraft.

23. A method according to claim 18 and further comprising:

providing with said multi-purpose financial services apparatus a card reader for reading a magnetic stripe bearing card and for providing a card input to said computer;

causing said card reader to read said magnetic stripe bearing card and provide said card input to said computer;

causing said computer in response to said card input and to user selection of a card input function and to user input of card input criteria to compute either of a credit payment and a debit payment due to a person withdrawing money in a selected currency.

24. A method according to claim 23 wherein said causing said card reader step comprises causing said card reader to read a credit card.

25. A method according to claim 23 wherein said causing said card reader step comprises causing said card reader to read a debit card.

26. A method according to claim 23 wherein said causing said computer in response to said card input step comprises computing wherein said criteria comprises a cash amount.

27. A method according to claim 18 and further comprising:

providing with said multi-purpose financial services apparatus an automated banknote dispenser in communication with said computer;

causing said dispenser to dispense a predetermined amount of money due to either of said purchaser and said person.

28. A method according to claim 18 wherein said providing a support step comprises providing a wheeled trolley.

29. A method according to claim 18 wherein said providing a support step comprises providing a counter.

30. A method of providing money exchange and point of sale services comprising:

providing a transport vehicle comprising:

a support located within an aircraft and containing at least one good for sale which is associated with a machine readable product code; and multi-purpose financial services apparatus mounted on said support comprising:

a computer including a display, said computer being programmed to perform money exchange and point of sale functions, said computer including a user input interface enabling a user to select money exchange and point of sale functions;

a product code reader suitable for reading said product code and providing a product input to said computer; and a banknote acceptor operative to accept banknotes in a plurality of currencies and providing a payment input to said computer;

causing said product code reader to read said machine readable product code;

causing said banknote acceptor to accept said payment input;

causing said computer in response to said product input and said payment input and to user selection of said product input function to compute change due to a purchaser of a product in a first currency; and causing said computer in response to said payment input and to user selection of said money exchange function to compute an exchange payment due to a person changing money in a second currency.

31. A method according to claim 30 wherein said providing a transport vehicle step comprises providing a transport vehicle which is an aircraft.

32. A method of providing money exchange and point of sale services comprising:

provising a support located within an aircraft and containing at least one good for sale which is associated with a machine readable product code;

providing multi-purpose financial services apparatus mounted on said support comprising:

a computer including a display, said computer being programmed to perform money exchange and point of sale functions, said computer including a user input interface enabling a user to select money exchange and point of sale functions; and a banknote acceptor operative to accept banknotes in a plurality of currencies and providing a payment input to said computer;

causing said banknote acceptor to accept said payment input;

causing said computer in response to said payment input and to user selection of said money exchange function to compute a payment due to a person changing money in a selected currency.

* * * * *